Dec. 8, 1959     A. L. MENNESSON     2,916,204
APPARATUS FOR INDICATING THE INSTANTANEOUS CONSUMPTION
OF A FLUID BY A MACHINE INCLUDING A ROTATING SHAFT
Filed Nov. 29, 1954     2 Sheets-Sheet 1
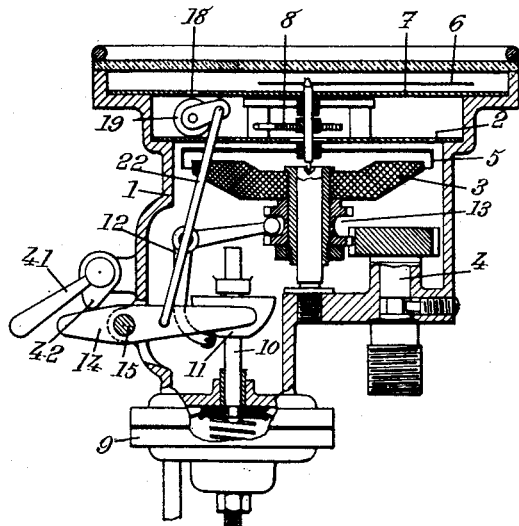
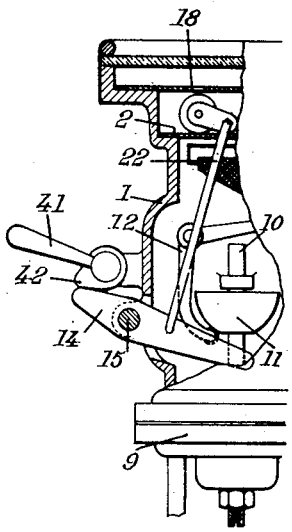
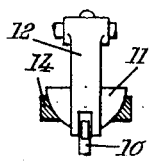
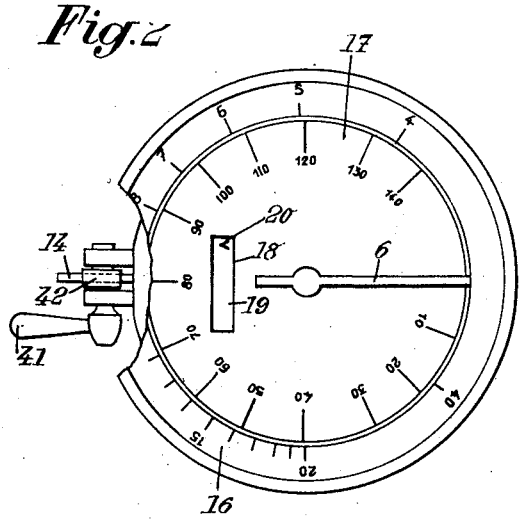
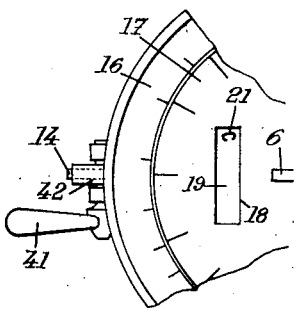
INVENTOR
André Louis Mennesson
BY
Bailey, Stephens and Huettig
ATTORNEY Dec. 8, 1959   A. L. MENNESSON   2,916,204
APPARATUS FOR INDICATING THE INSTANTANEOUS CONSUMPTION
OF A FLUID BY A MACHINE INCLUDING A ROTATING SHAFT
Filed Nov. 29, 1954   2 Sheets-Sheet 2
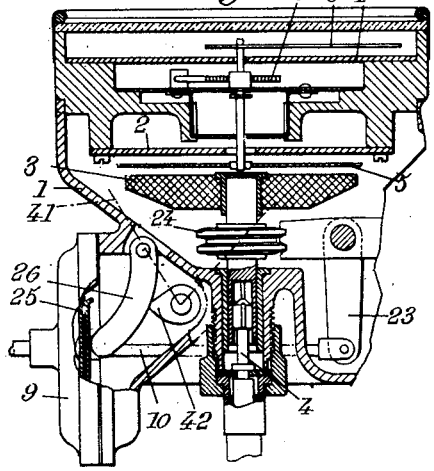
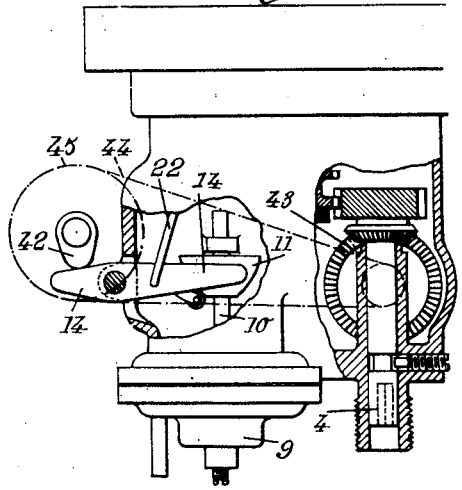
INVENTOR
André Louis Mennesson
BY
Bailey, Stephens and Huettig
ATTORNEY

# United States Patent Office 2,916,204
Patented Dec. 8, 1959

2,916,204

APPARATUS FOR INDICATING THE INSTANTANEOUS CONSUMPTION OF A FLUID BY A MACHINE INCLUDING A ROTATING SHAFT

André Louis Mennesson, Neuilly, France, assignor to Societe d'Appareils de Controle et d'Equipement des Moteurs S.A.C.E.M., Neuilly, France, a French society Application November 29, 1954, Serial No. 471,838

Claims priority, application France December 7, 1953

1 Claim. (Cl. 235—61)

The present invention relates to an apparatus for indicating the instantaneous consumption of a fluid, for instance fuel, by a machine including a rotating shaft, that is to say for indicating at any time either the ratio of the number of revolutions per unit of time of said shaft to the flow rate of said fluid per unit of time or, what is tantamount thereto, the ratio of this flow rate of fluid per unit of time to the number of revolutions of said shaft per unit of time.

When the machine is an internal combustion engine driving an automobile vehicle, the desired indication may be given in the form of the distance travelled over by said vehicle per unit of volume of fuel, for instance in miles per gallon, for a given gear combination of the gear box.

Such apparatus make it possible to know at any time the instantaneous fuel consumption of the engine expressed in one of the usual ways, for instance in liters of fuel per 100 kilometers or in miles travelled per gallon, or again in liters per number of revolutions per minute of the engine. It will be readily understood that the use of such apparatus makes it possible to run the engine in the best possible consumption conditions.

The object of the present invention is to provide a consumption indicator of this type which is better adapted to meet the requirements of practice than those existing at the present time.

For this purpose, I make use of an indicator constituted by the combination of a tachometer, including a movable pointer subjected to the opposed actions of a driving force variable with the speed of the rotating shaft and of a resilient antagonistic force, with means responsive to variations of the instantaneous fluid flow rate per unit of time for modifying at least one of said forces so that said pointer indicates the fluid consumption as above defined.

According to my invention, I provide means driven by said rotating shaft for periodically operating said force modifying means whereby the apparatus indicates now the fluid consumption now the speed of said rotating shaft.

Preferred embodiments of the present invention will be hereinafter described with reference to the accompanying drawings, given merely by way of example and in which:

Figs. 1 and 2 diagrammatically show in axial section and in plan view, respectively, a consumption indicator.

Figs. 3 and 4 are views similar to Figs. 1 and 2 respectively but showing only a portion of the apparatus in a different relative position of the elements thereof.

Fig. 5 is a side view of a detail of the apparatus of Figs. 1 to 4.

Fig. 6 is a diagrammatic vertical section of another consumption indicator.

Fig. 7 shows an apparatus made according to my invention.

In the following description it will be supposed that the apparatus according to the invention is intended to indicate the instantaneous fuel consumption of an internal combustion engine driving an automobile vehicle.

The indicator is essentially constituted by a tachometer including a movable pointer (that is to say a needle, a drum, a dial or the like) subjected to the action of a driving torque or force which varies in accordance with the speed of revolution of a shaft driven by the engine, this torque or force being balanced by an antagonistic torque or force exerted by a resilient device.

This structure is combined with means for modifying, in accordance with the instantaneous flow rate per unit of time of the fuel fed to the engine, at least one of the above mentioned torques or forces in such manner that, for a given speed of the vehicle (or of the engine), the amplitude of displacement of the movable pointer is the greater as said flow rate is lower.

Said means are arranged in such manner that they can temporarily be brought out of action, the displacements of the pointer then depending exclusively upon the value of the speed. Thus the apparatus can be used both as an instantaneous consumption indicator and as a tachometer or speedometer, the pointer being arranged to cooperate with two suitable graduations according as the above mentioned means are in or out of action.

According to a construction illustrated in my U.S. patent application Ser. No. 414,486 of March 5, 1954, now abandoned, the means responsive to variations of the instantaneous fuel flow rate per unit of time modify the driving torque acting upon the pointer.

The apparatus of Figs. 1 to 6 includes a casing 1 in which is journalled a magnet 3, for instance a permanent magnet, located opposite a soft iron plate 2, said magnet being driven at a speed proportional to that of the engine through a suitable transmission 4. Between plate 2 and magnet 3 there is provided a disc 5 of a non magnetic metal which drives a needle 6 cooperating with a dial 7 graduated in suitable units. A spring 8 balances the driving torque exerted by magnet 3 on disc 5.

Magnet 3 is moved away from or toward disc 5 when the instantaneous fuel flow rate per unit of time increases or decreases, respectively. This sliding movement of magnet 3 is produced by a diaphragm located in a box 9 and subjected to a pressure proportional to that existing at a suitably chosen point of the engine carburation system. This diaphragm actuates a rod 10 in accordance with the variations of said pressure and rod 10 causes magnet 3 to slide along its axis under the effect of suitable transmission means.

The pressure acting upon the diaphragm contained in box 9 is the suction existing in the induction pipe of the engine at a suitable point upstream of the throttle valve. The transmission means between said diaphragm and the magnet include a cam 11 carried by rod 10 and a lever 12 having two arms one of which is applied constantly against cam 11 by a spring (not shown) and the other arm of which has its end engaged in a groove 13 provided in a part rigid with magnet 3.

The apparatus further includes means for locking in a given position either the diaphragm contained in box 9 or the transmission means which transform the displacement of rod 10 into sliding displacements of magnet 3 in the direction of its axis.

Said locking means may be constituted by a lever 14 pivoted to frame 1 about an axis 15 and which may be brought in either of two different positions, to wit:

One in which said lever 14 is wholly out of the path of movement of cam 11, as shown by Fig. 3; and The other in which said lever 14 is in contact with cam 11 and holds it in a fixed position, as shown by Figs. 1 and 5.

When lever 14 is in the first position, the apparatus works as a consumption indicator since the position of the needle depends both upon the number of revolutions per minute of the engine and upon the rate of feed of fuel to the engine. In this case, pointer 6 indicates on a suitable scale 16 the consumption indicated for instance in liters per 100 km. or in miles per gallon.

In the second of these positions, the apparatus works as a conventional tachometer and it is therefore possible to read opposite needle 6 on a suitable scale 17 (Fig. 2) concentric with scale 16 the number of revolutions of the engine per minute or the speed of the vehicle, for instance in km./hour.

Advantageously there is provided opposite a slot 18 provided in dial 7 a drum 19 carrying two indications, one of which, to wit 20, indicates that the apparatus works as a tachometer (Fig. 2), whereas the other, 21, indicates that the apparatus works as an instantaneous fuel consumption indicator. Lever 14 is connected with said drum 19, for instance through a connecting rod 22, so that when the apparatus works as a tachometer (Fig. 1) indication 20 is visible through slot 18, whereas when the apparatus is working as a fuel consumption indicator (Fig. 3), indication 21 is visible through slot 18 (Fig. 4).

The construction illustrated by Fig. 6 is applicable to engines having a carburation system of the pressure type. In this case, the diaphragm 25 located in box 9 is subjected not to a suction but to the pressure under which fuel is injected. The transmission means for imparting sliding displacements to magnet 3 include a lever 23 pivoted to frame 1 of the apparatus and one of the arms of which is hinged to rod 10 fixed to diaphragm 25, the other arm forming a toothed sector in mesh with a part 24 rigid with magnet 3. Lever 23 is subjected to the action of a spring (not shown on the drawing) which yieldingly opposes the displacements imparted to diaphragm 25 located in box 9 in response to fuel pressure increases.

In this construction, means are provided for locking said diaphragm in a given position. Said means are constituted by a lever 23 arranged to occupy either of two positions, to wit:

A retracted one where it is out of contact with diaphragm 25; or

An active one where it is in contact with said diaphragm 25 (position shown on Fig. 6), which is thus prevented from being deformed and therefore fixes magnet 3 axially.

The operation of this apparatus is identical to that of the apparatus of Fig. 1.

According to my invention, the apparatus is automatically shifted periodically from one kind of operation to the other, by means driven by the rotating shaft. For instance, I may make use of the arrangement illustrated by Fig. 7 which is similar to that of Fig. 1.

In this case, cam 42 is rotated continuously at a speed proportional to that of transmission 4 through a device which advantageously includes a pair of bevel pinions 43, a speed reducing transmission, for instance including a chain 44, and a wheel 45 rigid with cam 42.

Such an arrangement makes it possible to use on an automobile vehicle a speed counter which, at given time intervals, for instance of fifteen seconds, indicates for a short time the instantaneous consumption.

In a general manner, while I have, in the above description, disclosed what I deem to be practical and efficient embodiments of my invention, it should be well understood that I do not wish to be limited thereto as there might be changes made in the arrangement, disposition and form of the parts without departing from the principle of the present invention as comprehended within the scope of the accompanying claim.

What I claim is:

For use in connection with a machine including a rotating shaft and which consumes a fluid, an apparatus of the type described which comprises, in combination, a casing, a pointer movable with respect to said casing, means movably carried by said casing and operatively connected with said shaft for exerting on said pointer in one direction a force variable in accordance with the number of revolutions per unit of time of said shaft, resilient means carried by said casing for exerting on said pointer a force in the opposed direction, means responsive to variations of the flow rate per unit of time of said fluid for controlling said first mentioned means to reduce the force exerted by said first mentioned means on said pointer when said flow rate increases and vice versa, means driven by said shaft for periodically disabling said third mentioned means and a dial carried by said casing in fixed position therein, said dial bearing, traced thereon, two scales each adapted to cooperate with said pointer for indication on one of said scales of the fluid consumption when said third mentioned means are operative, and on the other of said scales of the number of revolutions per unit of time of said shaft when said third mentioned means are disabled.

References Cited in the file of this patent
UNITED STATES PATENTS

| | | |
|---|---|---|
| 1,955,754 | Lyon | Apr. 24, 1934 |
| 2,268,549 | Kennedy | Jan. 6, 1942 |
| 2,593,628 | Strong | Apr. 22, 1952 |

FOREIGN PATENTS

| | | |
|---|---|---|
| 668,311 | Great Britain | Mar. 12, 1952 |